United States Patent
Brixius et al.

(10) Patent No.: US 6,860,377 B2
(45) Date of Patent: Mar. 1, 2005

(54) TRANSPORT SYSTEM FOR CARGO CONTAINERS, IN PARTICULAR FOR BAGGAGE CONTAINERS

(75) Inventors: Wolfgang Brixius, Neunkirchen (DE); Dominik Grafer, Nürnberg (DE); Albrecht Hoene, Lapporsdorf (DE)

(73) Assignee: Siemens Aktiengesellschaft, München (DE)

( * ) Notice: Subject to any disclaimer, the term of this patent is extended or adjusted under 35 U.S.C. 154(b) by 40 days.

(21) Appl. No.: 10/636,913

(22) Filed: Aug. 7, 2003

(65) Prior Publication Data

US 2004/0074738 A1 Apr. 22, 2004

(30) Foreign Application Priority Data

Aug. 7, 2002 (DE) .......................... 102 36 168

(51) Int. Cl.[7] .............................. B65G 47/10
(52) U.S. Cl. .................. 198/370.04; 414/425
(58) Field of Search ................ 198/370.04, 360, 198/369.2, 369.3; 414/425, 422, 419

(56) References Cited

U.S. PATENT DOCUMENTS

| 2,686,538 A | 1/1954 | Dooley | |
|---|---|---|---|
| 4,063,655 A | 12/1977 | Lambert | |
| 4,461,378 A | * 7/1984 | Roth | 198/370.04 |
| 5,632,589 A | * 5/1997 | Bray et al. | 414/339 |
| 5,839,566 A | * 11/1998 | Bonnet | 198/370.04 |

FOREIGN PATENT DOCUMENTS

| DE | 32 28 272 | 12/1983 |
|---|---|---|
| DE | 42 10 387 | 10/1993 |
| DE | 43 30 235 | 3/1995 |
| DE | 696 11 740 | 11/1996 |
| DE | 198 17 255 | 9/1999 |
| EP | 0 173 399 | 8/1985 |
| EP | 0 806 384 | 11/1997 |

* cited by examiner

*Primary Examiner*—Richard Ridley
(74) *Attorney, Agent, or Firm*—Henry M. Feiereisen

(57) ABSTRACT

A transport system for cargo containers includes at least two spaced-apart conveyors for transporting a cargo container in conveying direction along a substantially horizontal transport path, wherein at least one conveyor is driven. Disposed to the side of the other conveyor is an unloading device for discharging the cargo by tilting the container. The unloading device includes a track with a looped section, and a plurality of couplers constructed for engagement with the containers at a leading end of the looped section, as viewed in conveying direction, and for disengagement from the containers at a trailing end of the looped section. The looped section is spatially configured to tilt the container as a one of the couplers engages the oncoming container on one side adjacent the other conveyor and is guided along the track.

16 Claims, 2 Drawing Sheets

TRANSPORT SYSTEM FOR CARGO CONTAINERS, IN PARTICULAR FOR BAGGAGE CONTAINERS

CROSS-REFERENCES TO RELATED APPLICATIONS

This application claims the priority of German Patent Application, Serial No. 102 36 168.1, filed Aug. 7, 2002, pursuant to 35 U.S.C. 119(a)–(d), the disclosure of which is incorporated herein by reference.

BACKGROUND OF THE INVENTION

The present invention relates, in general, to a transport system for cargo containers, in particular for baggage containers.

Transport systems are oftentimes used in airport environment to transport checked bags along a conveyor path and to sort them for transfer to the destination. The baggage is hereby transported in containers and transferred to the destination by retrieving respective information inputted in an administrator. Unloading of the container, i.e. separating the content (baggage) from the container at the destination or transfer to a conveyor leading to the destination can be realized in many different ways.

According to the so-called "dynamic forced emptying process", the container is emptied by routing it along a rail in the form of a helical path for shifting the container into an angular disposition in which the axis is parallel to the transport direction. The container is held in this angular disposition for a period long enough for the content to slide out of the container. A drawback of this process is the absence of any discrimination as to which of the containers should, in fact, be tilted and which containers should remain undisturbed.

Another option involves a "limited dynamic but selectable emptying process", in which the container to be unloaded is moved to an unloading station for transfer to an arrangement of restraining elements positioned at a fixed spacing relative to one another. The restraining elements engage the container while the container is advanced. At a particular container position, the restraining elements are pivoted about an axis in parallel relationship to the transport direction to thereby shift the container into an inclined disposition. After emptying the content, the restraining elements are returned to their initial position and transferred to the next following conveying element. This process has the drawback that the containers have to be synchronized with the spacing between the restraining elements. As a result, the throughput is decreased.

Another option involves the "static but selectable emptying process" in which the container to be unloaded is moved to an unloading station, slowed down there to a speed zero (0) and tilted within this station about a fixed rotation axis. The container remains hereby in a same position relative to the tilting element, and the tilting element remains in the tilted position until the content has been removed from the container. After the emptying process, the container is returned to its initial position and exits the unloading station. Also this option results in a slow down of the speed by which the container is transported and thus in a decrease of the throughput.

It would therefore be desirable and advantageous to provide an improved transport system to obviate prior art shortcomings.

SUMMARY OF THE INVENTION

According to one aspect of the present invention, a transport system for cargo containers, in particular for baggage containers, includes a conveyor assembly for transporting a cargo container in conveying direction along a substantially horizontal transport path, with the conveyor assembly including at least two conveyors in spaced-apart relationship, wherein at least one of the conveyors is driven and the container is freely supported on the two conveyors; and an unloading device, disposed to the side of the other one of the conveyors, for discharging the cargo by tilting the container into an unloading position transversely to the conveying direction, wherein the unloading device includes a track having a looped section, and a plurality of couplers constructed for engagement with a container at a leading end of the track, as viewed in conveying direction, and for disengagement from the container at a trailing end of the track, wherein the looped section is spatially configured to tilt the container when a one of the couplers engages the container on one side adjacent the other conveyor and is forced to follow the loped section of the track.

The present invention resolves prior art problems by providing an unloading device that includes a track which is suitably configured to implement a tilting of the container to be unloaded. In this way, the containers can pass through the unloading station without decrease in the transport speed. The engagement between the couplers and the containers can be controlled individually so that a discrimination of containers is possible. In other words, through control of the operation of the couplers, a container is able to move through the unloading station uninhibited, i.e. without being tilted, or the container is acted upon by the unloading device for tilting while still being advanced at the conveying speed.

According to another feature of the present invention, the container has a coupler-distal edge which is supported on the driven conveyor while the container is elevated from the other conveyor by the unloading device. In this way, it is possible to maintain the conveying speed and to transport the cargo container through the unloading station, without a need for an additional drive. It is only required to provide the tilting motion for the container, if the container is intended for emptying.

According to another feature of the present invention, the driven conveyor may include a continuously revolving conveyor belt. The conveyor belt may be configured as toothed belt or cam belt. Of course, other types of conveyors are equally applicable for conveying the containers.

According to another feature of the present invention, the unloading device may include a plurality of vertically revolving rollers at a coupler-distal side wall of the unloading device in parallel relationship to the driven conveyor for preventing the container from slipping off on the side, where the edge of the container is supported on the conveyor, i.e. when the container assumes the tilted position. As an alternative, it is also possible to provide a vertical belt at the coupler-distal side wall of the unloading device in parallel relationship to the driven conveyor to support the container. When operated at a same speed as the driven conveyor, the vertical belt provides an additional drive for the container in the unloading station.

According to another feature of the present invention, the track may be constructed to define in conveying direction a curved path along which the coupler is forced to travel and whose course is composed of a tilting movement of the container and a transport movement of the container in the conveying direction. By forcing the couplers to move along the curved path, the lifting of the container is realized necessarily during the advance of the container, without requiring the arrangement of a separate tilting drive. Suitably, the curved path is determinative for a travel of the coupler. In other words, the curved path is so inclined in the direction of the track that the position of the coupler at the point of engagement with the container remains the same throughout, i.e. the distance between the coupler to the drive conveyor remains the same.

According to another feature of the present invention, the track can be constructed to form an endless loop, wherein the unloading device includes a plurality of carriages for attachment of the couplers, with the carriages and the couplers placed into one-to-one correspondence, and there is provided a control unit which is connected to the unloading device for operating the coupler at the leading end of the curved path of the track to engage the container in response to a determination that the container is to be unloaded and to carry the container along the curved path. As the coupler moves the container via the curved path, the container is forced to assume the tilted disposition, without requiring a separate tilting drive. The speed of the tilting motion is only determined by the speed of the container on the conveyor and the configuration of the curved path.

As the curved path is configured as part of an endless loop, the coupler can be so constructed as to automatically disengage from the container at the trailing end of the curved path for return to the leading end of the curved path via the endless loop.

According to another feature of the present invention, the unloading device may include a catch which is rendered operative in response to an instruction by the control unit to move the coupler into a movement path of the container for engagement. Suitably, the catch is realized as a lobe which is disposed on the periphery of a vertically revolving wheel arranged in an area immediately next to the leading end of the curved path, whereby the area of the leading end is disposed underneath the transport plane of the conveyor assembly, and the curved path runs in parallel relationship to a circumferential path of the wheel in the area of the leading end.

According to another feature of the present invention, the coupler may be configured as a bar which projects in the direction of the container for engagement in a complementary recess of the container.

A transport system according to the present invention has many advantages. The tilting process can be added randomly to realize an elevation of a container while its further advance is executed at same speed. This operation is completely independent from any distance between the containers. In other words, as the plurality of containers approach the unloading station, selection can be made which of the containers is to be tilted and which should remain flat on the conveyors. This selection can be carried regardless whether the transport speed of the containers is fast or slow and whether the distance between the containers is small or large. As a consequence, the throughput remains unaffected and can even be enhanced through increase of the transport speed and decrease of the distance between successive containers. The provision of carriages to support the couplers does not adversely affect the overall throughput, because the overall dimension of the carriages is significantly smaller than the dimension of the containers so that a sufficiently large number of carriages can be made available. The tilting operation can be implemented with a minimum of parts so costs can be minimized, rendering the overall transport system cost-efficient. As the kinematics of the tilting mechanism is suited to the kinematics of the container, the container can advance uninhibited and without positional constraints onto the tilting mechanism. The translational energy of the container can be exploited for the tilting motion so as to eliminate the need for a separate energy transmission. The tilting operation can also be implement in a harmonic motion with little noise and little wear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
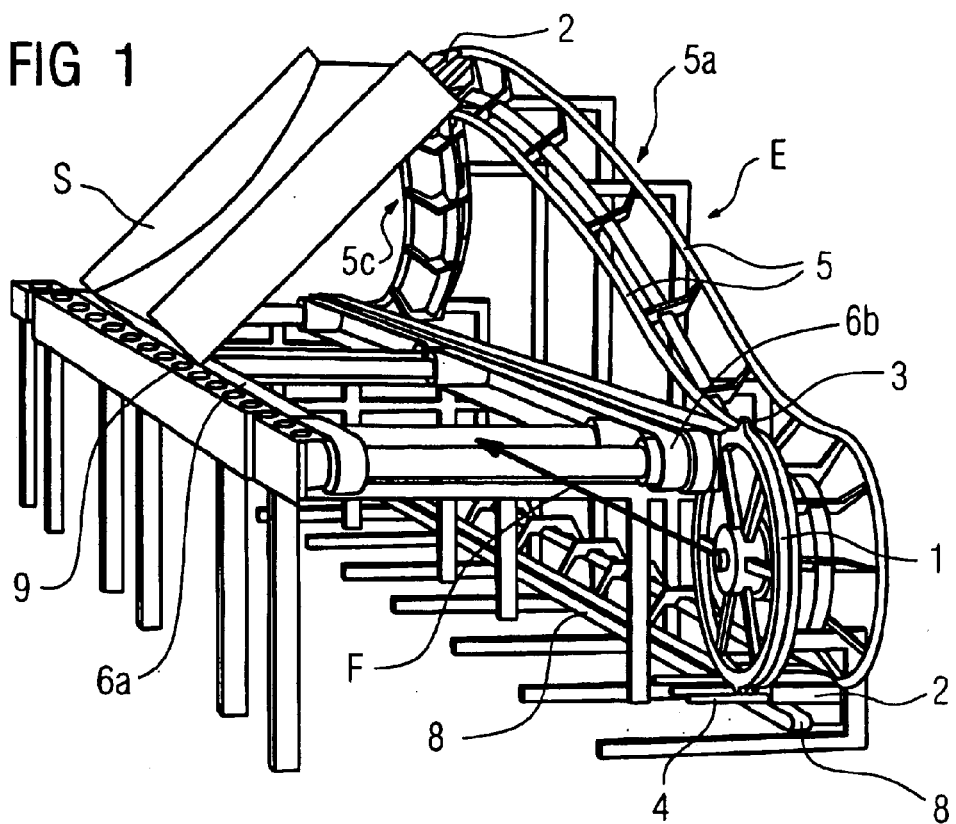
FIG. 1 is a simplified perspective view of a transport system according to the present invention having incorporated therein an unloading device for unloading a cargo container.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified perspective view of a transport system according to the present invention for unloading a cargo container S which can be made of a dimensionally stable plastic material. The container S has a cup-shaped surface for placement of an article to be transported, e.g. baggage, and is transported in conveying direction F upon two conveyors 6a, 6b which are arranged in spaced-apart relationship transversely to the conveying direction F. The conveyors 6a, 6b are constructed as endless conveyor belts, of which at least the conveyor 6a is driven by a suitable drive (not shown). Positioned to the side of the conveyor 6b is an unloading device, generally designated by reference character E, for unloading the container S from its content. The unloading device E includes a track, which is comprised in the non-limiting example of FIG. 1 of two parallel guide rails 5 and configured as a closed loop, and a plurality of carriages 2 which travel on the track 5. Each carriage 2 has rigidly secured thereon a coupler 4 which is configured as bar and projects inwardly from the carriage 2 toward the container S. The track 5 has an upper loop section 5a to define a spatial curved path which the carriages 2 are forced to follow, when engaging the containers S in a manner which will be described hereinafter.

Figure 2:
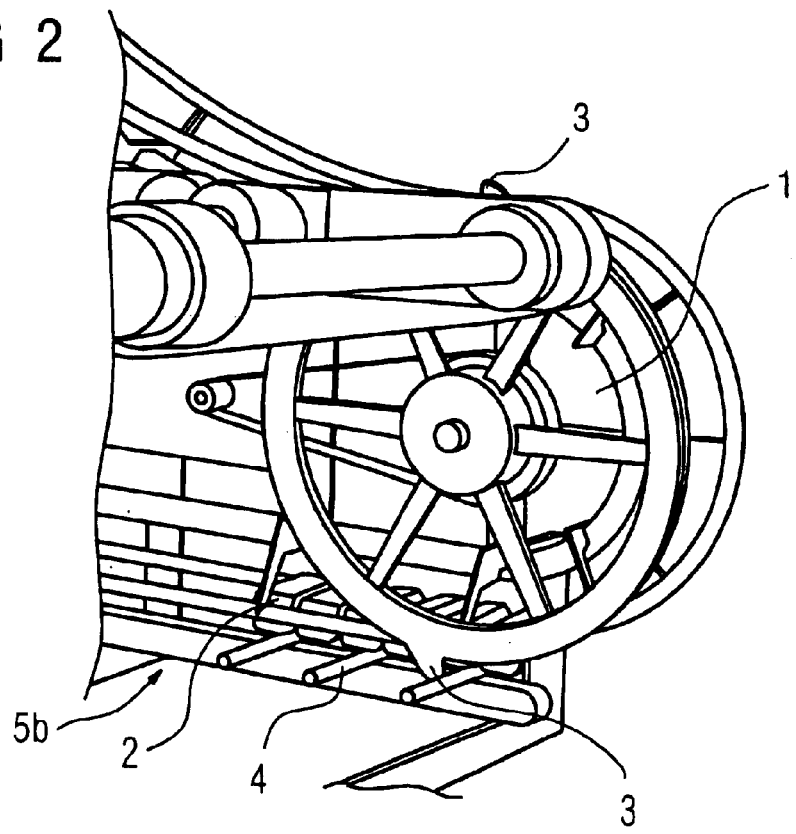
FIG. 2 is a detailed perspective, on an enlarged scale, of the transport system, showing the unloading device in the area of the leading end of curved path.
Figure 3:
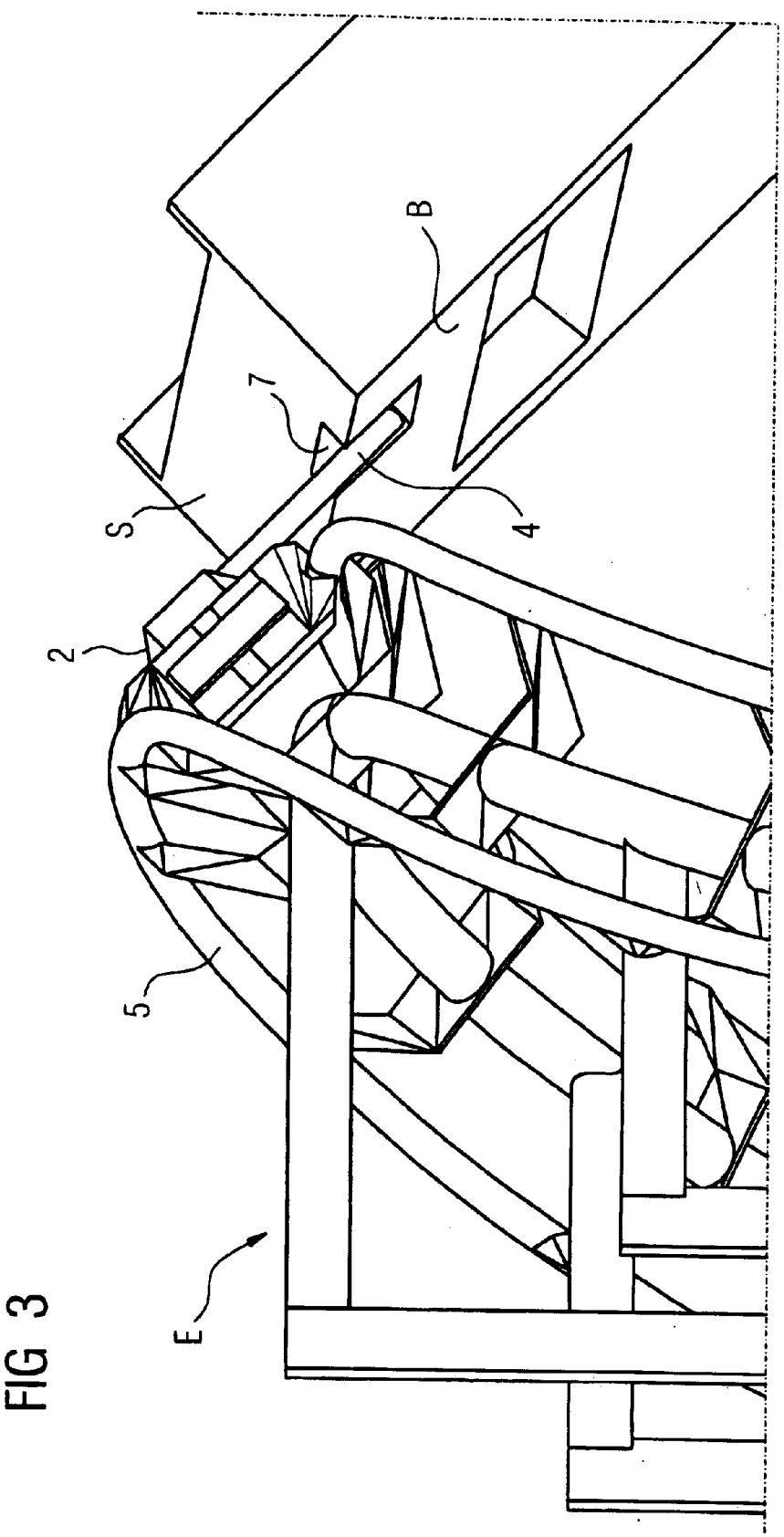
FIG. 3 is a detailed perspective view, on an enlarged scale, of the transport system, showing an interconnection with a container.

The track 5 is guided around a vertical wheel 1 which is disposed in the area of the leading end of the track 5, as view in conveying direction F. The wheel 1 is provided with at least one catch in the form of a lobe, here two lobes 3 which project in opposite disposition from the periphery of the wheel 1, for engagement behind the couplers 4 to thereby move the couplers 4 into registry with a recess 7 formed in the bottom B of the containers S in the center of the longitudinal container side, as shown in FIG. 3. Operation of the wheel 1 is controlled by a control unit (not shown) which has stored therein information about containers that should be tilted and containers that should not be tilted so as to discriminate between oncoming containers S. Thus, when the control unit sends a command signal to the wheel 1, the wheel 1 rotates to engage the respective lobe 3 behind the forwardmost coupler 3 (FIG. 2) and to move the coupler 4 into the recess 7 of the oncoming container S to be tilted.

The tilting operation is as follows: When a container S to be emptied from its contents passes a position on the transport system at a defined distance from the unloading station E, the control unit activates the wheel 1 to rotate counterclockwise to thereby separate with its lobe 3 a carriage 2 from the queue in the lower section 5b of the track 5 and to move the carriage 2 with its coupler 4 into registry with the oncoming container S. In this position, the coupler 4 is received in the recess 7 of the container S. As the coupler 4 enters into engagement with the container S, the lobe 3 of the wheel 1 disengages from the carriage 2 so that the carriage 2, without any separate drive, is able to freely move along the track 5. The container S is advanced by the driven conveyor 6a and moves hereby the carriage 2 via the form-fitting connection between the coupler 4 and the recess 7 in the container bottom B along the curved path of the upper loop section 5a of the track 5 upwards. Positioned next to the driven conveyor 6a are rollers 9 to prevent the edge of the tilted container 5 from slipping off the conveyor.

In order to improve the advance of the container S during the tilting operation, it may, optionally, be suitable to provide, instead of the rollers 9, a driven vertical belt (not shown) which runs at a same speed and in same direction as the conveyors 6a, 6b. The driven conveyor 6a can be realized by friction as well as by form-fitting connection. As the carriage 2 moves along the curved path of the loop section 5a, the container S is thus guided into the inclined position, shown in FIG. 1.

The curved path of the loop section 5a of the track 5 is hereby configured to keep accelerations and delays below 1 G so as to prevent a detachment of the container S from the coupler 4. Of course, it is possible to implement accelerations during elevation of the container S above the acceleration of gravity (>1 G), when higher delay values are desired and a retaining mechanism is provided to engage the container S in the area of the coupler 4 to prevent an uncontrolled detachment of the container S.

After the content has been discharged from the tilted container S, e.g., by sliding out under the force of gravity, the container S gently follows a downward section 5c of the track 5 until returning to the horizontal disposition. At the end of the unloading station E, the carriage 2 releases the container S and returns downwards under the force of gravity or through operation of a belt 8 to the queue of carriages 2 in the lower section 5b of the track 5.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A transport system for cargo containers, in particular for baggage containers, comprising:
   a conveyor assembly for transporting a cargo container in conveying direction along a substantially horizontal transport path, said conveyor assembly including at least two conveyors in spaced-apart relationship, wherein at least one of the conveyors is driven and the container is freely supported on the two conveyors; and
   an unloading device, disposed to the side of the other one of the conveyors, for discharging the cargo by tilting the container into an unloading position transversely to the conveying direction, said unloading device including a track having a looped section, and a plurality of couplers constructed for engagement with a container at a leading end of the track, as viewed in conveying direction, and for disengagement from the container at a trailing end of the track, wherein the looped section is spatially configured to tilt the container when a one of the couplers engages the container on one side adjacent the other conveyor and is forced to follow the loped section of the track.

2. The transport system of claim 1, wherein the container has a coupler-distal edge which is supported on the driven conveyor while the container is elevated from the other conveyor by the unloading device.

3. The transport system of claim 2, wherein the driven conveyor includes a continuously revolving conveyor belt.

4. The transport system of claim 1, wherein the unloading device includes a plurality of vertically revolving rollers at a coupler-distal side wall of the unloading device in parallel relationship to the driven conveyor for supporting the container.

5. The transport system of claim 1, wherein the unloading device includes a vertical belt at a coupler-distal side wall of the unloading device in parallel relationship to the driven conveyor for supporting the container.

6. The transport system of claim 1, wherein the looped section is constructed to define in conveying direction a curved path along which the coupler is forced to travel and whose course is composed of a tilting movement of the container and a transport movement of the container in the conveying direction.

7. The transport system of claim 6, wherein the course of the curved path is determinative for a travel of the couplers.

8. The transport system of claim 6, wherein the track is constructed to form an endless loop, said unloading device including a plurality of carriages for attachment of the couplers, wherein the carriages and the couplers are placed into one-to-one correspondence, and further comprising a control unit operatively connected to the unloading device for operating the coupler at the leading end of the curved path to engage the container in response to a determination that the container is to be unloaded and to move the container along the curved path.

9. The transport system of claim 8, wherein the coupler is constructed to automatically disengage from the container at the trailing end of the curved path for return to the leading end of the curved path.

10. The transport system of claim 6, wherein the unloading device includes a catch rendered operative in response to a command by the control unit to synchronize a movement of the coupler into a movement path of the container for engagement.

11. The transport system of claim 10, wherein the unloading device has a vertically revolving wheel disposed in an area immediately next to the leading end of the curved path, with the area of the leading end disposed underneath a transport plane of the conveyor assembly, wherein the curved path runs in parallel relationship to a circumferential path of the wheel in the area of the leading end, said catch being constructed as a lobe projecting from a periphery of the wheel for engagement behind the coupler.

12. The transport system of claim 1, wherein the coupler is configured as a bar projecting in the direction of the container for engagement in a complementary recess of the container.

13. A transport system for a container, comprising:

a conveyor for transporting the container in conveying direction;

an unloading device disposed to the side of the conveyor and including a track having a looped section configured for tilting the container transversely to the conveying direction, and a coupler movable along the track and constructed for engagement with the container at a leading end of the track, as viewed in conveying direction, and for disengagement from the container at a trailing end of the track; and a control unit operatively connected to the unloading device for operating the coupler to engage the container in response to a determination that the container is to be unloaded, and to move the container along the looped section.

14. The transport system of claim 13, wherein the looped section is constructed in conveying direction to define an ascending section followed by a descending section.

15. The transport system of claim 13, wherein the unloading device includes a vertical wheel having a lobe and rendered operative in response to a command by the control unit to engage the lobe behind the coupler, thereby moving the coupler into engagement with the container.

16. The transport system of claim 13, wherein the coupler is configured for engagement in a complementary recess of the container.

* * * * *

UNITED STATES PATENT AND TRADEMARK OFFICE
CERTIFICATE OF CORRECTION

PATENT NO. : 6,860,377 B2
DATED : March 1, 2005
INVENTOR(S) : Wolfgang Brixius, Dominik Gräfer and Albrecht Hoene It is certified that error appears in the above-identified patent and that said Letters Patent is hereby corrected as shown below:

<u>Title page,</u>
Item [75], Inventors, change the second inventor's last name to -- Gräfer --; change the third inventor's city of residence to -- Lappersdorf --.

Signed and Sealed this

Twenty-seventh Day of September, 2005

JON W. DUDAS
*Director of the United States Patent and Trademark Office*